United States Patent
Ono et al.

(10) Patent No.: US 11,874,962 B2
(45) Date of Patent: Jan. 16, 2024

(54) INFORMATION INPUT DEVICE

(71) Applicant: Nippon Telegraph and Telephone Corporation, Tokyo (JP)

(72) Inventors: Kazuyoshi Ono, Tokyo (JP); Shin Toyota, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/011,752

(22) PCT Filed: Jun. 24, 2020

(86) PCT No.: PCT/JP2020/024781
§ 371 (c)(1),
(2) Date: Dec. 20, 2022

(87) PCT Pub. No.: WO2021/260831
PCT Pub. Date: Dec. 30, 2021

(65) Prior Publication Data
US 2023/0273677 A1    Aug. 31, 2023

(51) Int. Cl.
*G06F 3/01*    (2006.01)

(52) U.S. Cl.
CPC ............................. *G06F 3/013* (2013.01)

(58) Field of Classification Search
CPC ......... G06F 3/013; G06F 3/015; G02C 11/00; G02C 11/10; G02B 27/0093
See application file for complete search history.

(56) References Cited

U.S. PATENT DOCUMENTS

| 11,428,955 | B1* | 8/2022 | Lewis | G02C 7/101 |
| 2004/0070729 | A1* | 4/2004 | Wiebe | A61B 5/398 |
| | | | | 351/209 |
| 2004/0243342 | A1* | 12/2004 | Rekimoto | G06F 3/011 |
| | | | | 702/150 |
| 2018/0107275 | A1* | 4/2018 | Chen | G06F 3/015 |

(Continued)

FOREIGN PATENT DOCUMENTS

WO    WO-2023027578 A1 *    3/2023

OTHER PUBLICATIONS

Biopac Systems, Inc., "Active Electrode: TSD150 Series—Products : Biopac Systems", [Searched on May 22, 2020], (http://biopac-sys.jp/products/tsd150a/), 4 pages. As discussed in the specification.

(Continued)

*Primary Examiner* — Michael Pervan
(74) *Attorney, Agent, or Firm* — Slater Matsil, LLP

(57) ABSTRACT

A first determination unit determines whether a movement of an eyelid or an eyebrow of a wearer has occurred, based on an electric signal measured by a measurement electrode with a common electrode as a ground potential. A second determination unit determines that a movement of a face of the wearer has occurred when a distortion detection unit detects distortion of the spectacle frame. An output unit outputs a command due to operation of the spectacle frame by the wearer when the first determination unit determines that the movement of the eyelid or the eyebrow of the wearer has occurred and at the same time the second determination unit determines that the movement of the face of the wearer has occurred.

12 Claims, 3 Drawing Sheets

(56) References Cited

U.S. PATENT DOCUMENTS

| | | | |
|---|---|---|---|
| 2020/0249752 A1* | 8/2020 | Parshionikar | G06F 1/163 |
| 2021/0297584 A1* | 9/2021 | Moubedi | G06F 3/017 |
| 2023/0102507 A1* | 3/2023 | Azemi | G06F 1/3203 |
| | | | 345/156 |
| 2023/0244298 A1* | 8/2023 | Ono | G06F 3/01 |
| | | | 345/156 |

OTHER PUBLICATIONS

Ichikawa et al. "Development of Interface System using Electromyograms of Face Movements" 10th Forum on Information Technology, vol. 2, G-018, 2011, pp. 559-560. As discussed in the specification.

Konno et al., "Method for Multi-dimensional Operation Interface Using Eye Location Detection", Journal of the Institute of Image Information and Television Engineers, vol. 61, No. 4, 2007, pp. 518-525. As discussed in the specification.

Sagarifuji, "What is the Future of Eye Controlled Communication Devices for Individuals with Special Needs", Creact Corp., Chapter 2, Special Feature B: Disability Aid and Visuals, Journal of the Institute of Image Information and Television Engineers, 2015, vol. 69, No. 6, pp. 530-534. As discussed in the specification.

Yamashita et al., "Propagation of the High Frequency Component Caused by the Impact on the Tooth," J Jpn Prosthodont Soc, vol. 43, 1999, pp. 489-494. As discussed in the specification.

* cited by examiner

INFORMATION INPUT DEVICE

CROSS-REFERENCE TO RELATED APPLICATIONS

This application is a national phase entry of PCT Application No. PCT/JP2020/024781, filed on Jun. 24, 2020, which application is hereby incorporated herein by reference.

TECHNICAL FIELD

The present invention relates to an information input device configured to input information.

BACKGROUND

Eye gaze interfaces have been put to practical use as devices configured for individuals with severe congenital limb defects to input information into information processing devices such as a computer (NPL 1). Functions of pointing devices included in user interfaces ordinarily used by healthy people, such as a mouse, are required to access information usually used by healthy people. That is, to access information, operation of moving a pointer and a movement comparable to a click (click, press, drag, or drop) are required to be included as functions that operate a pointer or an icon displayed on a screen of a computer (NPL 2).

CITATION LIST

Non Patent Literature

NPL 1: Naoko Sagarifuji, "What is the Future of Eye Controlled Communication Devices for Individuals with Special Needs", Chapter 2, Special Feature B: Disability Aid and Visuals, Journal of the Institute of Image Information and Television Engineers, Vol. 69, No. 6, pp. 530-534, 2015.
NPL 2: Hidetoshi Konno, et al., "Method for Multi-dimensional Operation Interface Using Eye Location Detection", Journal of the Institute of Image Information and Television Engineers, Vol. 61, No. 4, pp. 518-525, 2007.

SUMMARY

Technical Problem

In known techniques, for example, an eye-tracker is used to achieve operation of moving a pointer by an eye gaze and a movement comparable to a click by blinking. However, in known techniques, a malfunction may occur in the pointing function due to an involuntary movement that is different from the user's intent. For example, when a user blinks despite the intention of the user, the device recognizes it as a movement comparable to a click. For this reason, the user needs to use the device with caution to avoid the involuntary movement. In known techniques, the user falls into a situation in such a manner that the user is forced to limit blinks that is against the user's intention during use of the device, and a burden of the user such as fatigue has been large.

Embodiments of the present invention are contrived to solve the above-described problem, and an object thereof is to enable information to be input in a natural form for the user with the burden of the user being reduced.

Means to Solve Problems

An information input device according to an aspect of embodiments of the present invention includes a spectacle frame, a measurement electrode provided in at least one of a nose pad and a rim of the spectacle frame and configured to measure an electric signal caused by a movement of an eyelid or an eyebrow of a wearer, a distortion detection unit provided in the spectacle frame and configured to detect distortion of the spectacle frame, a first determination unit configured to determine whether the movement of the eyelid or the eyebrow of the wearer has occurred, based on the electric signal measured by the measurement electrode, a second determination unit configured to determine whether a movement of a face of the wearer has occurred when the distortion detection unit detects the distortion of the spectacle frame, and an output unit configured to output a command due to operation of the spectacle frame by the wearer when the first determination unit determines that the movement of the eyelid or the eyebrow of the wearer has occurred and at the same time the second determination unit determines that the movement of the face of the wearer has occurred.

Effects of Embodiments of the Invention

As described above, in accordance with aspects of embodiments of the present invention, the first determination unit determines whether the movement of the eyelid or the eyebrow of the wearer of the spectacle frame has occurred and the second determination unit determines whether the movement of the face of the wearer of the spectacle frame has occurred, and thus it is possible to input information in a natural form for the user with the burden of the user being reduced.

DETAILED DESCRIPTION OF ILLUSTRATIVE EMBODIMENTS

Hereinafter, an information input device according to embodiments of the present invention will be described.

First Embodiment

Figure 1A:
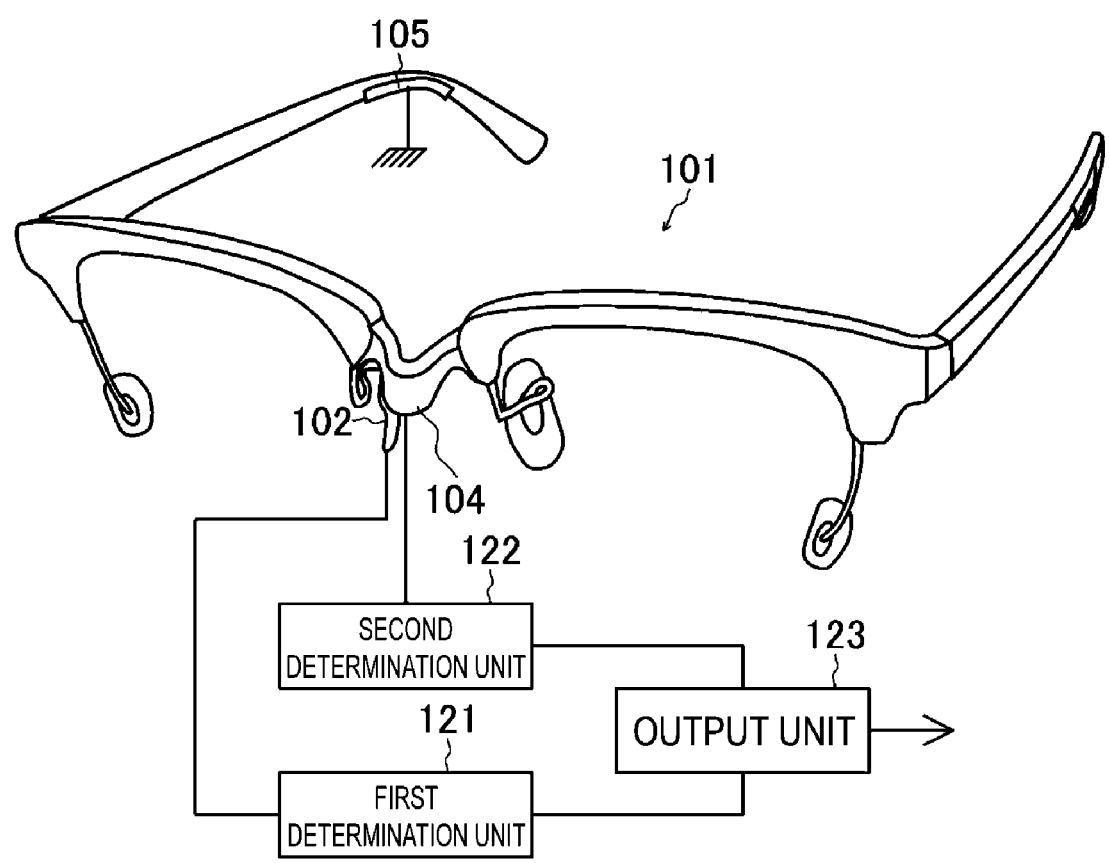
FIG. 1A is a configuration diagram illustrating a configuration of an information input device according to a first embodiment of the present invention.
Figure 1B:
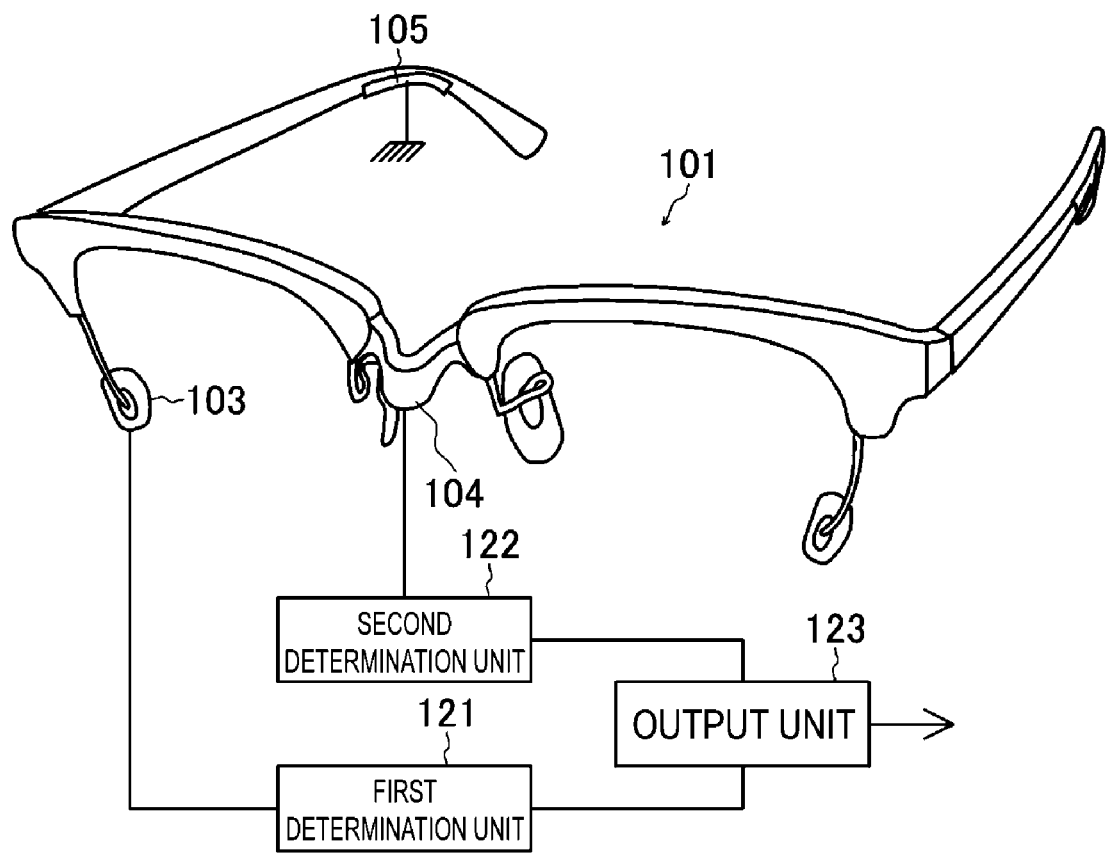
FIG. 1B is a configuration diagram illustrating a configuration of another information input device according to the first embodiment of the present invention.

First, an information input device according to a first embodiment of the present invention will be described with reference to FIGS. 1A and 1B. The information input device includes a spectacle frame 101, a measurement electrode 102, a distortion detection unit 104, a first determination unit 121, a second determination unit 122, and an output unit 123. The information input device also includes a common electrode 105 provided in a temple tip of the spectacle frame 101 and contacts skin of a wearer of the spectacle frame 101 at a part of the temple tip. The common electrode 105 can also be provided in at least one of the two temple tips.

The measurement electrode 102 is provided in a nose pad of the spectacle frame 101 and used to measure an electric signal caused by a movement of an eyelid or an eyebrow of the wearer. The measurement electrode 102 contacts skin of the wearer at a nose pad of the spectacle frame 101 and is used to measure potential of a part that is in contact with the skin. Alternatively, as illustrated in FIG. 1B, a measurement electrode 103 can be provided on a rim of the spectacle frame 101. In this case, the measurement electrode 103 contacts skin of the wearer at a rim of the spectacle frame 101 and is used to measure potential of a part that is in contact with the skin.

The distortion detection unit 104 is provided in the spectacle frame 101 and detects distortion of the spectacle frame 101. The distortion detection unit 104 can be provided, for example, in a bridge of the spectacle frame 101. It is generally known that a human can voluntarily move his/her face, for example, his/her ear, by paying attention to the frontalis muscle, the auricular muscle, the temporal muscle, and the occipitalis muscle. When these muscles move, a displacement occurs between the temporal region and the glabellar. The spectacle frame 101 deflects in response to this displacement, and thus the distortion detection unit 104 detects this distortion. For example, a distortion detection unit 104 can be configured from a thin film displacement sensor (bending sensor) available from Spectra Symbol Corp.

The ear can be moved back and forth voluntarily by paying attention mainly to the frontalis muscle, the auricular muscle, the temporal muscle, and the occipitalis muscle. For example, when the wearer moves his/her ear back and forth, stress is generated in the spectacle frame 101 due to displacement of the ear back and forth. The stress is detected by the distortion detection unit 104, and thus the forward and backward movement of the ear of the wearer can be detected.

The eyebrows can be moved up and down as a voluntary movement by paying attention mainly to the corrugator supercilii muscle, the frontalis muscle, the procerus muscle, the orbicularis oculi muscle, the temporal muscle, and the nose muscle. For example, a stress is generated in the spectacle frame 101 due to displacement caused by the wearer moving his/her eyebrows voluntarily. The stress is detected by the distortion detection unit 104, and thus the upward and downward movement of the eyebrows of the wearer can be detected.

The first determination unit 121 determines whether a movement of an eyelid or an eyebrow of a wearer has occurred, based on an electric signal measured by the measurement electrode 102 with the common electrode 105 as a ground potential. The first determination unit 121 amplifies a potential signal obtained from the measurement electrode 102, removes noise and the like from the amplified signal, extracts, for example, an eye electrograph signal, and compares the extracted eye electrograph signal with respect to a reference signal stored to determine whether the movement of the eyelid or the eyebrow of the wearer has occurred.

Here, the myoelectric signals of mimetic muscles differ in amplitude from movement to movement even for an identical test muscle, and thus feature extraction for each of the test muscles is important (see Reference 1). In the feature extraction, for example, a rectified and smoothed signal is obtained from a signal waveform measured and processed, a variation in time is obtained from the waveform of the rectified and smoothed signal obtained, and the feature extraction described above is performed.

The second determination unit 122 determines that a movement of a face of the wearer has occurred when the distortion detection unit 104 detects distortion of the spectacle frame 101. The second determination unit 122 amplifies a potential signal obtained from the distortion detection unit 104, removes noise and the like from the amplified signal, and compares the signal after noise and the like are removed with respect to a reference signal stored to determine whether the distortion has occurred in the spectacle frame 101.

Incidentally, the movement in which the user moves the eyebrows up and down to be detected by the distortion detection unit 104 and the movement of the eyebrow determined by the electric signal measured by the measurement electrode 102 are different with respect to each other. For example, the movement in which the user moves the eyebrows up and down to be detected by the distortion detection unit 104 is associated with other movement of the face that occurs simultaneously in this movement, and consequently, a stress is generated in the mechanical frame 101. On the other hand, the movement of the eyebrow determined by the electric signal measured by the measurement electrode 102 does not involve other movement of the face, and does not cause stress to the mechanical frame 101.

Note that digitizing processing can be performed on the measured signal in each of the determination units. Additionally, adding or subtracting processing can be performed on the obtained signal in each of the determination units. Also, each of the determination units can perform management of identification of the wearer, as necessary.

An output unit 123 outputs a command due to operation of the spectacle frame 101 by the wearer when the first determination unit 121 determines that the movement of the eyelid or the eyebrow of the wearer has occurred and at the same time the second determination unit 122 determines that the movement of the face of the wearer has occurred. The output unit 123 also has a function to feed back presence of a signal being measured or a signal output and processed by an external device to the wearer by voice, vibration, or the like.

The output unit 123 can also transmit signals processed by each of the determination units to an external device such as a smartphone or a tablet terminal, or a personal computer. For example, the output unit 123 transmits each signal to an external device by a wireless communication, such as Bluetooth (trade name) or wireless LAN, or a wired communication. The output unit 123 may also include a function of receiving a signal processed and transmitted by an external device.

The determination units and the output unit 123 may include a computer device including, such as, a central processing unit (CPU), a main storage device, an external storage device, and a network connection device. The CPU operates (executes a program) by a program deployed in the main storage device, so that each of the functions described above can be achieved.

According to the first embodiment described above, two independent and different voluntary movements of the movement of the eyelid or the eyebrow of the wearer and the movement of the face of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction. The muscles of the face connect the bones to the skin and can create complex facial expressions. On the other hand, multiple muscles of a face are associated with each other by two movements. Two different types of voluntary movements can be generated functional-anatomically independently and spontaneously by the wearer on such facial muscles and skeletal structures.

Second Embodiment

Figure 2:
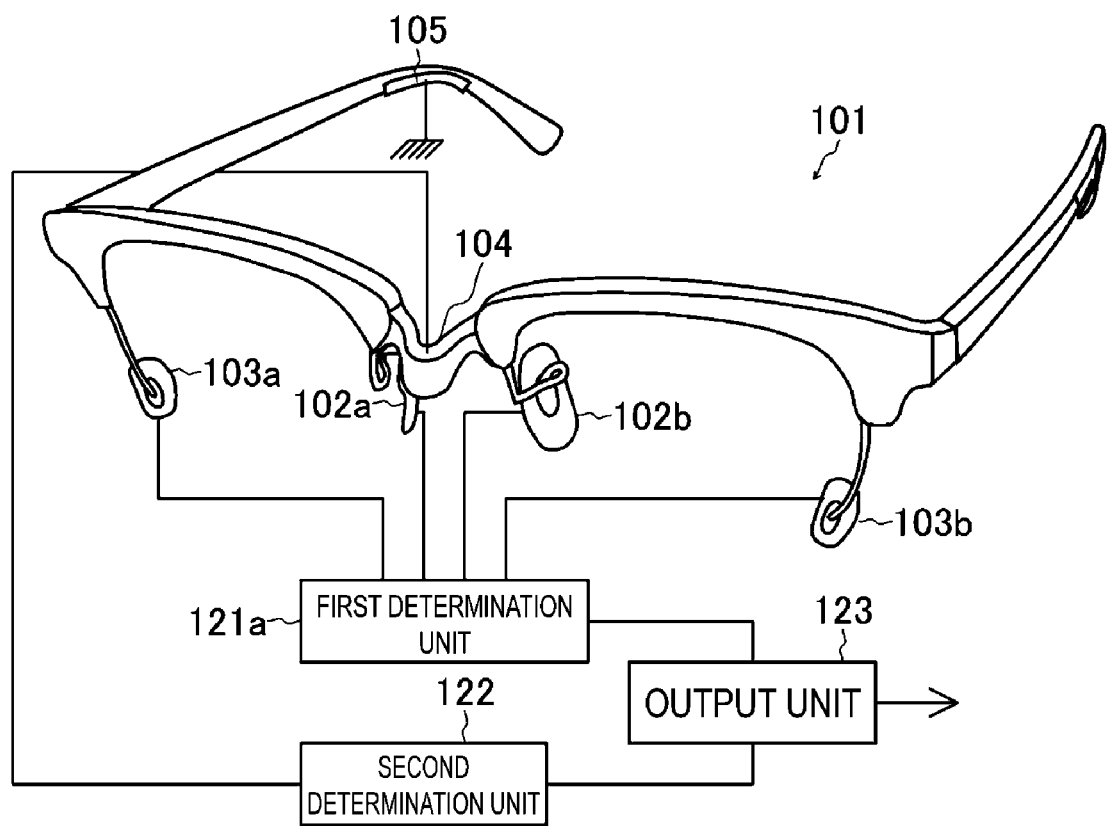
FIG. 2 is a configuration diagram illustrating a configuration of an information input device according to a second embodiment of the present invention.

Next, an information input device according to a second embodiment of the present invention will be described with reference to FIG. 2. The information input device includes a spectacle frame 101, a first nose pad electrode iota, a second nose pad electrode 102b, a first rim electrode 103a, a second rim electrode 103b, a distortion detection unit 104, a first determination unit 121a, a second determination unit 122, and an output unit 123. The information input device also includes a common electrode 105. The distortion detection unit 104, the second determination unit 122, and the common electrode 105 are similar to those of the first embodiment described above.

The first nose pad electrode 102a and the second nose pad electrode 102b, are each provided in a corresponding pad of two nose pads of the spectacle frame 101 and each contact skin of the wearer at a part of the corresponding nose pad. The first rim electrode 103a and the second rim electrode 103b each contact skin of the wearer at a part of the corresponding rim. In the second embodiment, the first nose pad electrode 102a, the second nose pad electrode 102b, the first rim electrode 103a, and the second rim electrode 103b, configure a measurement electrode. These electrodes are used to measure an electric signal caused by a movement of an eyelid or an eyebrow of the wearer. Each of the electrodes described above can employ an active electrode (Reference 2).

The first determination unit 121a determines whether a movement of an eyelid or an eyebrow of a wearer has occurred, based on an electric signal measured by the first nose pad electrode 102a, the second nose pad electrode 102b, the first rim electrode 103a, and the second rim electrode 103b. The first determination unit 121 amplifies a potential signal obtained from each of the first measurement electrode described above, removes noise and the like from the amplified signal, extracts, for example, an eye electrograph signal, and compares the extracted eye electrograph signal with respect to a reference signal stored to determine whether the movement of the eyelid or the eyebrow of the wearer has occurred.

Specifically, potential of mimetic muscles or ocular potential around the right eye is measured (detected) by differential potential between the first nose pad electrode iota and the first rim electrode 103a with the common electrode 105 as a ground potential. Also, potential of mimetic muscles or ocular potential around the left eye is measured (detected) by differential potential between the second nose pad electrode 102b and the second rim electrode 103b with the common electrode 105 as a ground potential. Also, potential of mimetic muscles or oculus potential can be detected by differential potential between the first nose pad electrode iota and the second nose pad electrode 102b or differential potential between the first rim electrode 103a and the second rim electrode 103b with the common electrode 105 as a ground potential.

The second determination unit 122 determines that a movement of a face of the wearer when the distortion detection unit 104 detects distortion of the spectacle frame 101 similar to the first embodiment described above.

The output unit 123 outputs a command due to operation of the spectacle frame 101 by the wearer when the first determination unit 121 determines that the movement of the eyelid or the eyebrow of the wearer has occurred and at the same time the second determination unit 122 determines that the movement of the face of the wearer has occurred. The output unit 123 also has a function to feed back presence of a signal being measured or a signal output and processed by an external device to the wearer by voice, vibration, or the like.

In the second embodiment described above as well, two independent and different voluntary movements of the movement of the eyelid or the eyebrow of the wearer and the movement of the face of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction.

As described above, in accordance with aspects of embodiments of the present invention, the first determination unit determines whether the movement of the eyelid or the eyebrow of the wearer of the spectacle frame has occurred and the second determination unit determines whether the movement of the face of the wearer of the spectacle frame has occurred, and thus it is possible to input information in a natural form for the user with the burden of the user being reduced.

Meanwhile, the present invention is not limited to the embodiments described above, and it will be obvious to those skilled in the art that various modifications and combinations can be implemented within the technical idea of the present invention.

Reference 1: Kaoru Ichikawa and Junichi Hori, "Development of Interface System using Electromyograms of Face Movements" 10th Forum on Information Technology, Vol. 2, G-018, pp. 559-560, 2011.

Reference 2: BIOPAC SYSTEMS, Inc., "Active Electrode: TSD150 Series", [Searched on May 22, 2020], (http://biopac-sys.jp/products/tsd150a/).

Reference 3: Rika Yamashita, et al., "Propagation of the High Frequency Component Caused by the Impact on the Tooth", Journal of Prosthodontic Research, Vol. 43, pp. 489-494, 1999.

REFERENCE SIGNS LIST

101 Spectacle frame
102 Measurement electrode
103 Measurement electrode
104 Distortion detection unit
105 Common electrode
121 First determination unit
122 Second determination unit
123 Output unit.

The invention claimed is:

1. An information input device comprising:
a spectacle frame;
a measurement electrode provided in the spectacle frame and configured to measure an electric signal caused by a movement of an eyelid or an eyebrow of a wearer of the spectacle frame;
a distortion detection circuit in the spectacle frame and configured to detect distortion of the spectacle frame;
a first determination circuit configured to determine whether the movement of the eyelid or the eyebrow of the wearer has occurred, based on the electric signal measured by the measurement electrode;
a second determination circuit configured to determine that a movement of a face of a wearer has occurred when the distortion detection circuit detects the distortion of the spectacle frame; and an output circuit configured to output a command due to operation of the spectacle frame by the wearer when the first determination circuit determines that the movement of the eyelid or the eyebrow of the wearer has occurred concurrently with the second determination circuit determining that the movement of the face of the wearer has occurred.

2. The information input device according to claim 1, wherein:

the spectacle frame includes a nose pad; and the measurement electrode is disposed in the nose pad.

3. The information input device according to claim 1, wherein:

the spectacle frame includes a rim; and the measurement electrode is disposed in the rim.

4. The information input device according to claim 1, wherein:

the spectacle frame includes a first nose pad and a second nose pad; and the measurement electrode includes a first nose pad electrode and a second nose pad electrode disposed in the first nose pad and the second nose pad, respectively, the first nose pad electrode and the second nose pad electrode each being configured to come into contact with skin of the wearer.

5. The information input device according to claim 1, wherein:

the spectacle frame includes a first rim and a second rim; and the measurement electrode includes a first rim electrode and a second rim electrode disposed in the first rim and the second rim, respectively, the first rim electrode and the second rim electrode each being configured to come into contact with skin of the wearer.

6. The information input device according to claim 1, wherein:

the spectacle frame includes a temple tip; and the information input device further includes a common electrode disposed in the temple tip and configured to come into contact with skin of the wearer.

7. A method of operating information input device, the method comprising:

measuring, a measurement electrode in a spectacle frame, an electric signal caused by a movement of an eyelid or an eyebrow of a wearer of the spectacle frame;

detecting, by a distortion detection circuit in the spectacle frame, distortion in the spectacle frame;

determining whether the movement of the eyelid or the eyebrow of the wearer has occurred, based on the electric signal measured by the measurement electrode;

determining that a movement of a face of the wearer has occurred when the distortion detection circuit detects the distortion of the spectacle frame; and outputting, by an output circuit, a command due to operation of the spectacle frame by the wearer in response to determining that the movement of the eyelid or the eyebrow of the wearer has occurred concurrently with determining that the movement of the face of the wearer has occurred.

8. The method according to claim 7, wherein:

the spectacle frame includes a nose pad; and the measurement electrode is disposed in the nose pad.

9. The method according to claim 7, wherein:

the spectacle frame includes a rim; and the measurement electrode is disposed in the rim.

10. The method according to claim 7, wherein:

the spectacle frame includes a first nose pad and a second nose pad; and the measurement electrode includes a first nose pad electrode and a second nose pad electrode disposed in the first nose pad and the second nose pad, respectively, the first nose pad electrode and the second nose pad electrode each being configured to come into contact with skin of the wearer.

11. The method according to claim 7, wherein:

the spectacle frame includes a first rim and a second rim; and the measurement electrode includes a first rim electrode and a second rim electrode disposed in the first rim and the second rim, respectively, the first rim electrode and the second rim electrode each being configured to come into contact with skin of the wearer.

12. The method according to claim 7, wherein:

the spectacle frame includes a temple tip; and the information input device further includes a common electrode disposed in the temple tip and configured to come into contact with skin of the wearer.

\* \* \* \* \*